United States Patent [19]
Holmes

[11] 4,371,266
[45] Feb. 1, 1983

[54] TELEVISION GHOST DETECTOR SYSTEM
[75] Inventor: David D. Holmes, Chesterfield, N.J.
[73] Assignee: RCA Corporation, New York, N.Y.
[21] Appl. No.: 230,310
[22] Filed: Jan. 30, 1981
[30] Foreign Application Priority Data
  Aug. 14, 1980 [GB] United Kingdom ............... 8026515
[51] Int. Cl.³ ............................................. H04N 5/21
[52] U.S. Cl. ................................. 358/167; 358/905
[58] Field of Search ................ 358/36, 37, 160, 167, 358/905

[56] References Cited
U.S. PATENT DOCUMENTS
  3,935,536  1/1976  Kimura et al. .................. 325/476
  4,053,932  10/1977 Yamaguti et al. ............... 358/167
  4,152,657  5/1979  Robers et al. .................. 328/165

*Primary Examiner*—Robert L. Richardson
*Attorney, Agent, or Firm*—E. M. Whitacre; P. J. Rasmussen; W. B. Yorks, Jr.

[57] ABSTRACT

A television ghost detector system is provided which receives a training signal component of the video signal followed by a signal interval which may contain a ghost of the training signal. The training signal activates the production of a varying search signal, which in turn initiates the production of a sequence of identification pulses. The identification pulses are compared with the video signal interval following the training signal, and a coincidence signal is produced when a ghost appears in time coincidence with an identification pulse. The coincidence signal causes the value of the varying search signal to be stored as an indication of the delay of the ghost with respect to the training signal. During subsequent training signal intervals, an identification pulse is produced only when the search signal attains the previously stored value, and the identification pulse is phase compared with the ghost to update the stored value to a more precise value. If the ghost is lost or disappears, the system reverts to its initial mode of operation.

6 Claims, 8 Drawing Figures

TELEVISION GHOST DETECTOR SYSTEM

This invention relates to television ghost signal detector systems and, in particular, to a system which detects a television ghost signal without the need for a delay line.

Television ghost detector systems may utilize a delay line to determine the time location of the ghost signal with respect to the main television signal. Such a system is shown in my copending United States patent application Ser. No. 230,309, entitled "TELEVISION SIGNAL GHOST DETECTOR". In that system, a video signal is applied to the input of the delay line, and the delay of the delay line is varied until the delayed main signal at the output of the delay line is produced at the same time as the ghost signal is applied to the input. The delay of the delay line then represents the delay of the ghost signal with respect to the main signal.

It is also desirable to construct a ghost detector system which does not require a delay line. The benefits of such a system include elimination of both the delay line and the means for varying its delay, extended range of ghost detection, and ease of manufacturability.

In accordance with the principles of the present invention, a television ghost detector system is provided which receives a training signal component of the video signal. The training signal component may be followed by a ghost of itself. The training signal activates a search ramp, which in turn initiates the production of a sequence of identification pulses. The identification pulses are compared with the video signal until a ghost signal appears in time coincidence with an identification pulse. The coincidence of the two signals switches a mode swithc from the search mode to the track mode. The track mode signal halts the search ramp, with the level of the search ramp signal being stored to provide an indication of the time interval between the training signal and its ghost. During succeeding training signal intervals, an indentification pulse is produced at the time indicated by the stored level of the search ramp signal with reference to the time of the training signal. The identification pulse is compared in phase with the ghost signal, and the stored search ramp signal is modified in accordance with the result of the phase comparison so that subsequent identification pulses are produced in time coincidence with succeeding ghosts. In this way, the ghost signal is tracked during each training signal interval.

Figure 1:
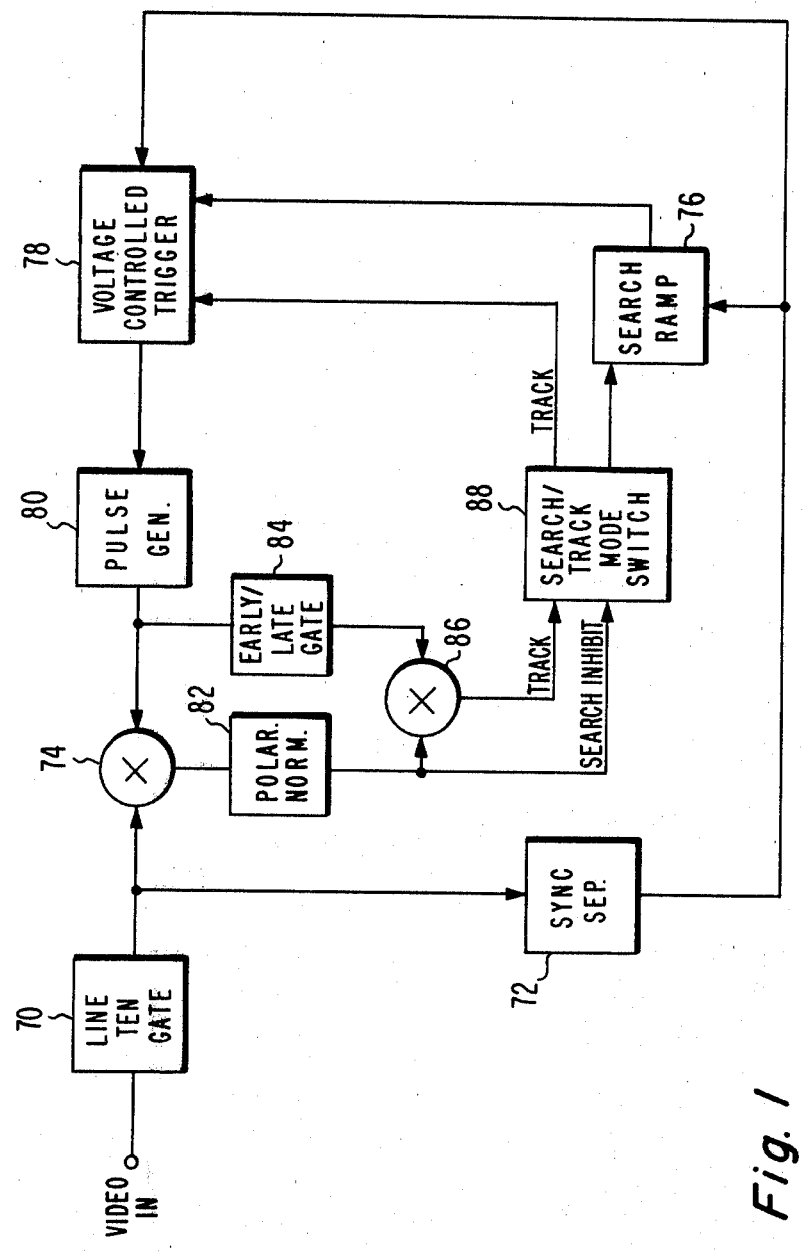
FIG. 1 illustrates, in block diagram form, a television ghost detector system constructed in accordance with the principles of the present invention.

Referring to FIG. 1, a television ghost detector is shown. A video signal is applied to a line ten gate 70, which passes only line ten of a field to the ghost detector. Line ten of the field normally contains a horizontal sync pulse and no video information. If the television signal contains a ghost component, a ghost of the sync pulse will be located in the line interval following the sync pulse.

The line ten information is applied to a coincidence detector 74 and a sync separator 72, the latter serving to separate the line ten sync pulse from any ghost pulses appearing in the line. The separated line ten sync pulse is applied as an initiation signal to a search ramp circuit 76 and a voltage-controlled trigger 78. The ramp produced by the search ramp circuit 76 is applied as an input signal to the voltage-controlled trigger 78. The trigger output of the voltage-controlled trigger 78 is applied to the input of a pulse generator 80, the output of which is coupled to a second input of the coincidence detector 74 and to an early/late gate 84. The output of the coincidence detector 74 is coupled by way of a polarity normalization circuit 82 to one input of a further coincidence detector 86 and a search/track mode switch 88. The output of the early/late gate 84 is coupled to the other input of coincidence detector 86, the output of which is coupled to the search/track mode switch 88. One output of the search/track mode switch 88 is coupled to the voltage-controlled trigger 78, and another output is coupled to the search ramp circuit 76.

Figure 2:
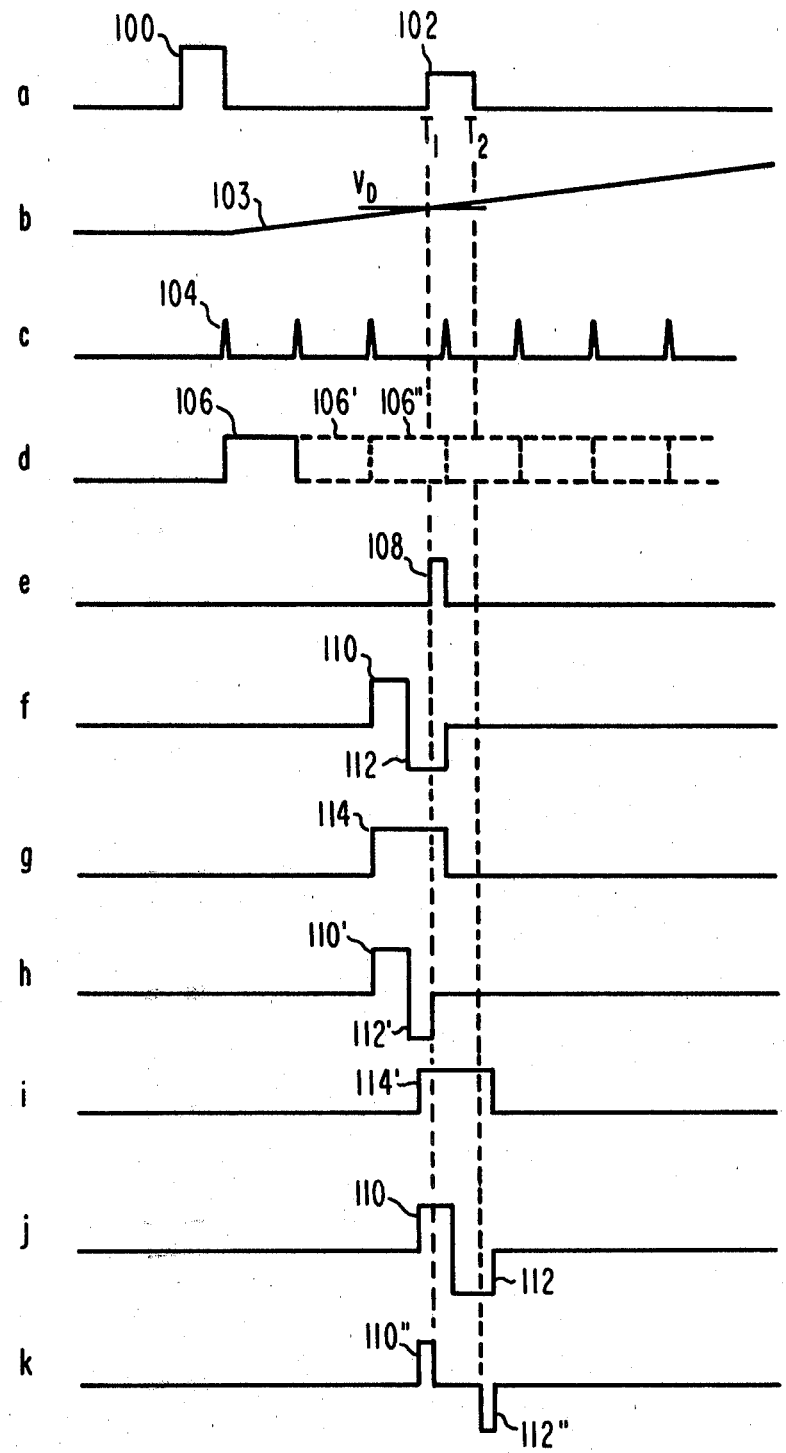
FIG. 2 illustrates waveforms depicting the operation of the system of FIG. 1.

Operation of the arrangment of FIG. 1 is explained with reference to the waveforms of FIG. 2. The line ten gate 70 applies the line ten sync pulse 100 of FIG. 2a to the coincidence detector 74 and the sync separator 72, as well as any subsequent ghost pulses in line ten, such as ghost pulse 102. The sync separator 72 applies the sync pulse 100 to the search ramp circuit 76 and voltage-controlled trigger 78 to initiate their operation. The search ramp circuit 76 produces a voltage ramp 103 as shown in FIG. 2b. The voltage ramp time position modulates the trigger output of the voltage-controlled trigger 78. The output of the voltage-controlled trigger produces trigger pulses 104, as shown in FIG. 2c, upon the attainment of predetermined voltage levels by the voltage ramp 103. The trigger pulses will trigger the pulse generator 80 to produce pulses occuring at successive time intervals, as shown in FIG. 2d by search pulses 106, 106', 106". At the time that the ramp voltage has reached a level $V_D$, the pulse generator 80 is producing a pulse 106", which is shown separately in FIG. 2g as search pulse 114. The pulse 114 is in partial time coincidence with the ghost pulse 102, at which time the coincidence detector 74 produces an output signal 108, as shown in FIG. 2a, thereby indicating that the ghost has been detected.

The output of the coincidence detector is polarity normalized by the polarity normalization circuit 82, and the normalized signal switches the search/track mode switch to the track mode to inhibit further searching by the search ramp circuit 76, and hence the production of subsequent trigger pulses 104 and search pulses. The final search ramp level, $V_D$, is stored by the voltage controlled trigger in response to the initiation of the track mode. The search pulse 114 produced by the pulse generator 80, like the previous search pulses 106 and 106', causes the early/late gate 84 to generate a double-polarity signal 110, 112, as shown in FIG. 2f. The early/late gate signal 110, 112 is compared with the polarity normalized coincidence detector pulse by coincidence detector 86 to develop a tracking control signal which is indicative of the phase relationship between the coincidence pulse 108 and the search pulse 114.

It is seen that the ghost pulse 102 is not fully coincident with the search pulse 114, as the time of occurrence of the ghost pulse, $T_1$, occurs during the latter portion of search pulse 114. By use of the early/late gate signal and the second coincidence detector 86, the tracking loop will act to center the search pulse with respect to the ghost pulse.

The normalized pulse 108 is compared with the early/late gate signal 110, 112 by the coincidence detector 86 to produce an output signal 110', 112' as shown in FIG. 2h. This output signal exhibits a greater width positive polarity portion than the negative polarity portion, and is converted into an adjustment voltage by the search/track mode switch 88. The adjustment voltage is applied to the voltage-controlled trigger 78 to modify the stored voltage ramp level, $V_D$, which determines the time at which the subsequent search pulse is produced in the track mode. In this case, the search pulse 114' of the following line ten interval is produced at a delayed time with respect to pulse 114, as shown in FIG. 2i. In the track mode, only one search pulse is produced in a line ten interval, at the time that the search ramp attains the previously stored level $V_D$, as modified by the early/late gate adjustment voltage. If the next line ten ghost pulse occurs during the same $T_1 - T_2$ time interval, it will be centered with respect to the early/late gate signal shown in FIG. 2j. The output signal of coincidence detector 86 will then exhibit equal and opposite polarity pulses 110" and 112" as shown in FIG. 2k, thereby indicating that no further adjustment of the search pulse is required.

If tracking of the ghost pulse is lost, the search/track mode switch reverts to the search mode until a new ghost pulse is acquired.

The search ramp voltage level $V_D$ at which the ghost pulse is detected, as modified by the tracking signal adjustment voltage, provides information as to the delay of the ghost pulse 102 with respect to the sync pulse 100. This voltage may therefore be used to control a VCO clock for a variable delay line in a ghost cancellation circuit, such as the ghost cancellation circuit described in my copending United States patent application number (74,784A), entitled "TELEVISION GHOST CANCELLATION SYSTEM".

Figure 3:
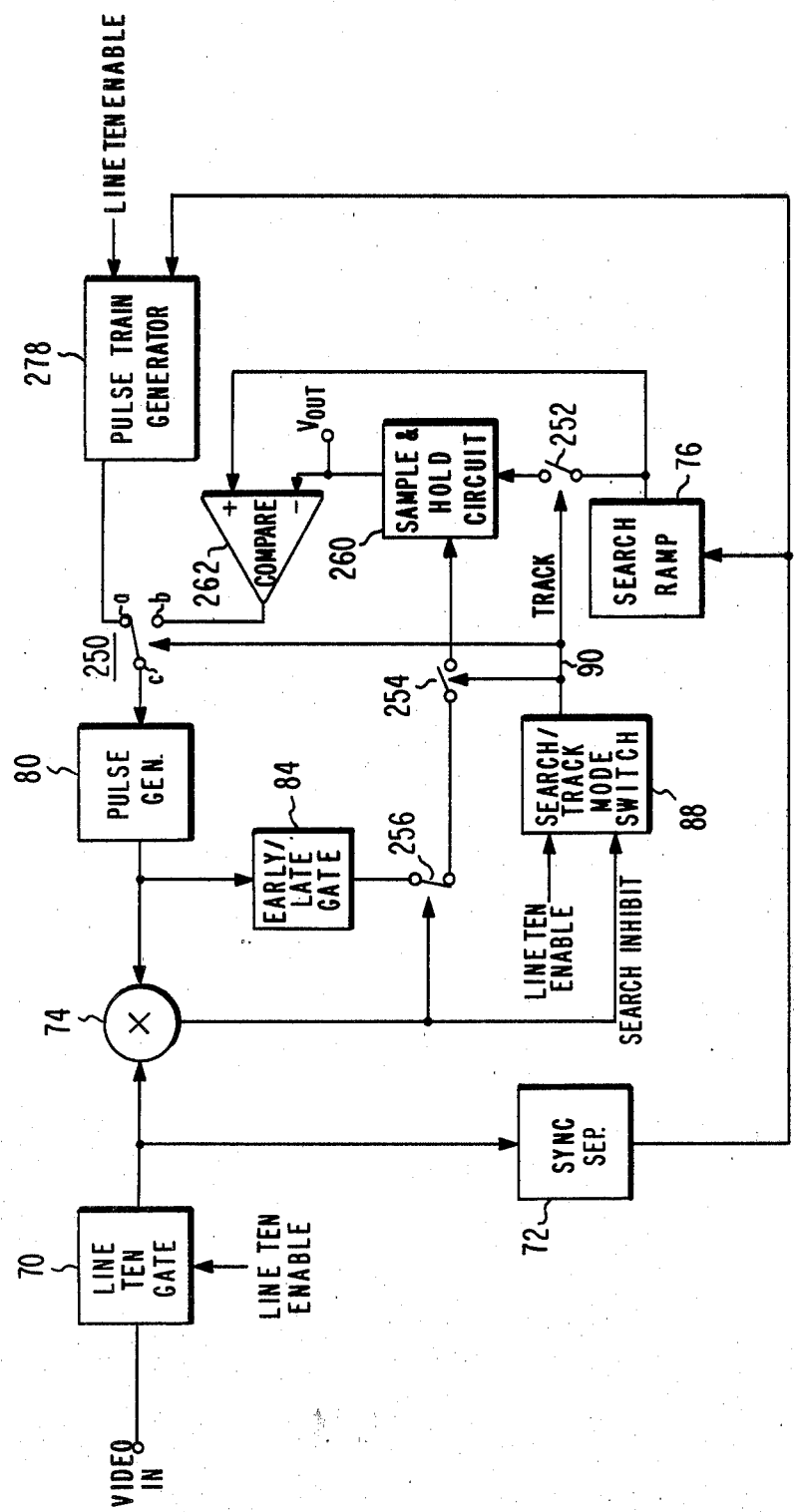
FIG. 3 illustrates, in block diagram form, a second embodiment of a television ghost detector system constructed in accordance with the principles of the present invention.

FIG. 3 illustrates an alternative embodiment of a ghost detector system constructed in accordance with the principles of the present invention. Various elements of the embodiment of FIG. 3 have been described in the discussion of FIG. 1, and bear the same reference numerals. Their discussion will be omitted.

In the arrangement of FIG. 3, the output of the line ten gate 70 is again coupled to coincidence detector 74 and sync separator 72. The line ten gate is closed during the line ten interval by a line ten enable signal. The output of the sync separator 72 is coupled to the input of the search ramp circuit 76, and to an input of a pulse train generator 278. The line ten enable signal is also applied as an input signal to the pulse train generator 278. The output of the pulse train generator 278 is coupled to terminal a of a two-position switch 250. The common terminal c of switch 250 is coupled to the input of the pulse generator 80. The output of the pulse generator 80 is again coupled to an input of the coincidence detector 74 and to the input of the early/late gate 84.

The output of the search ramp circuit 76 is coupled to an input of a sample-and-hold circuit 260 by way of a switch 252, and to an input of a comparator 262. The sample-and-hold circuit 260 provides an output signal which is applied to an output terminal $V_{out}$ and to a second input of the comparator 262. The output of the comparator 262 is coupled to terminal b of switch 250.

The output of the early/late gate 84 is coupled to an input of the sample-and-hold circuit 260 by way of switches 256 and 254. The output of the coincidence detector 74 is coupled to an input of the search/track mode switch 88, and is coupled to supply a control signal to switch 256. The search/track mode switch 88 also receives the line ten enable signal as an input signal. The output of the search/track mode switch is coupled to apply control signals to switches 250, 252 and 254.

Figure 4:
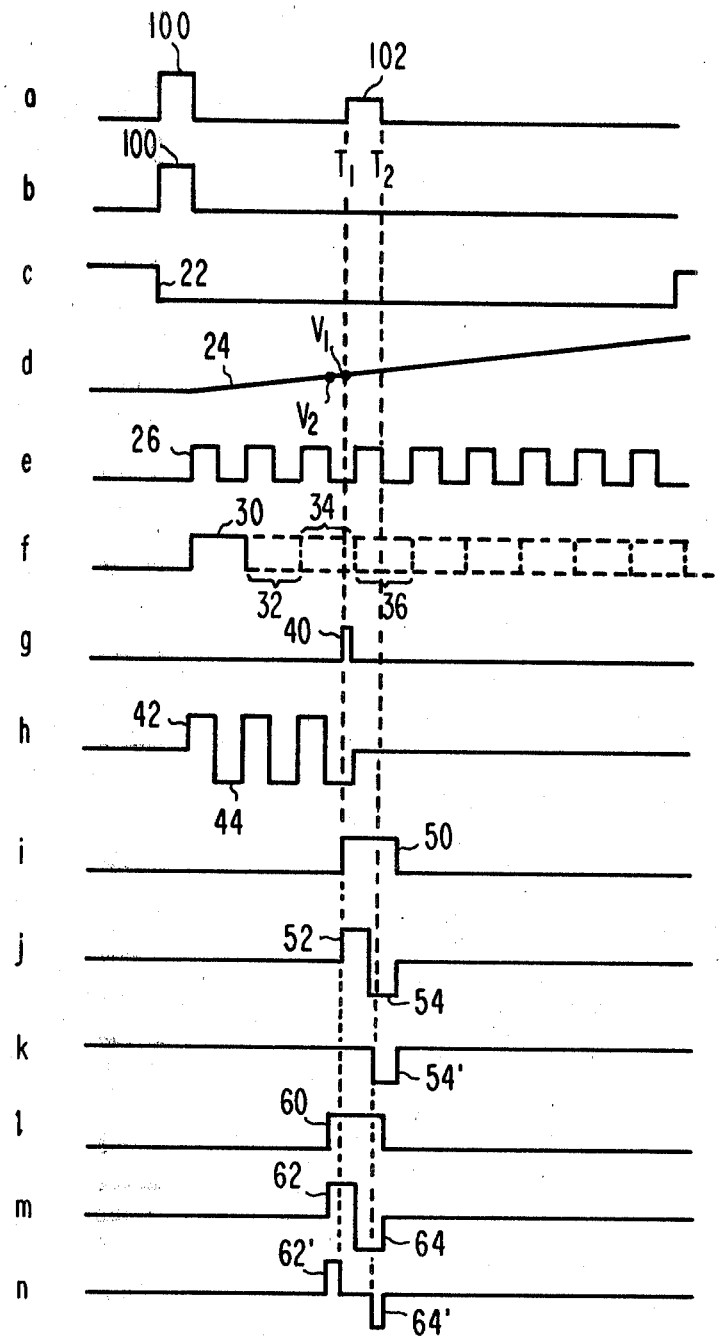
FIG. 4 illustrates waveforms depicting the operation of the system of FIG. 3.

The operation of the arrangement of FIG. 3 is illustrated by the waveforms of FIG. 4. FIG. 4a shows a line ten sync pulse 100, which is followed in time by a ghost pulse 102 of the sync pulse, occurring during time interval $T_1 - T_2$. The sync separator 72 produces the line ten sync pulse 100 as its output, as shown in FIG. 4b. The line ten enable signal 22 is shown in FIG. 4c.

At the end of the sync pulse interval, the search ramp circuit begins to generate a ramp 24, as shown in FIG. 4d. The pulse train generator is actuated at the end of the line ten sync pulse, and produces a pulse train 26, as shown in FIG. 4e, for the remaining duration of the line ten interval. When the system is searching for a ghost signal, the arm of switch 250 connects the a and c terminals, and the pulse train 26 is applied as the input signal for the pulse generator 80.

Each pulse of the pulse train 26 triggers the generation of an identification pulse by the pulse generator 80, as shown by identification pulses 30, 32, 34, 36, etc. in FIG. 4f. These identification pulses are applied to the early/late gate 84, which produces a positive pulse and a negative pulse during each identification pulse interval, as shown by pulses 42 and 44 in FIG. 4h. Switch 254 is open during the search mode, and the early/late gate pulses are not applied to the sample-and-hold circuit 260 at this time.

Identification pulse 34 is seen to be partially coincident with ghost pulse 102. The coincidence detector 74 will produce a coincidence pulse 40 during the coincident period, as shown in FIG. 4g. The coincidence pulse 40 opens the normally closed switch 256, and switches the search/track mode switch 88 to the track mode, which produces a "Track" signal at its output 90. The Track signal opens switch 252, causing the sample-and-hold circuit 260 to hold the present search ramp level, illustratively shown as $V_1$ in FIG. 4d. The Track signal also switches the switch 254 to the closed position, and switches the arm of switch 250 to the b position.

During the next line ten interval, the pulse generator 80 is controlled by the comparator 80. The search ramp circuit 76 is initiated as before, and the ramp 24 is applied to one input of the comparator. The other input of the comparator is receiving the $V_1$ ramp level stored by the sample-and-hold circuit 260. When the ramp 24 reaches the $V_1$ level at time $T_1$, the output of the comparator produces a pulse which triggers the pulse generator 80. The pulse generator 80 will produce a single identification pulse 50, as shown in FIG. 4i. The identification pulse 50 is coincident with the ghost pulse during the interval $T_1-T_2$. A coincidence pulse is produced during this interval, which opens switch 256 during the $T_1-T_2$ interval.

The early/late gate 84 produces positive and negative pulses 52, 54 in response to the identification pulse 50, as shown in FIG. 4j. The early/late gate 84 and the switch 256 thus effectively act to make a phase comparison between the ghost saignal 102 and the identification pulse 50. In this example, the switch 256 closes at the end of the coincidence period, $T_2$, and a portion 54' of the early/late gate signal, shown in FIG. 4k, is conducted to the sample-and-hold circuit 260 by way of switch 254. This portion 54' modifies the stored ramp level. In this case, the stored level is reduced slightly to level $V_2$, as shown in FIG. 4d.

During the next line ten interval, the comparator 262 will trigger the pulse generator 80 when the ramp 24 reaches the stored level $V_2$. The pulse generator 80 will then produce an identification pulse 60, as shown in FIG. 4l, which in turn initiates the production of an early/late gate signal 62, 64 as shwn in FIG. 4m. A positive portion 62' of the early/late gate signal is passed to the sample-and-hold circuit before the coincidence signal opens switch 256 at time $T_1$, as shown in FIG. 4n. When the switch 256 closes at time $T_2$, a negative portion 64', of the early/late gate signal is conducted to the sample-and-hold circuit. The portions 62' and 64' are equal in duration and amplitude but opposite in polarity; thus, they effectively negate each other. There is no net change of the stored voltage level $V_2$, as the identification pulse 60 is centered in time with respect to the ghost pulse 102. The sample-and-hold circuit output signal $V_{out}$ (which is equal to $V_2$) is thus a measure of the delay of the ghost pulse 102 with respect to the main signal 100.

If the ghost signal disappears or moves beyond the range of the identification pulse, tracking will be terminated. In these circumstances, no coincidence pulse will be produced by the coincidence detector 74. The search/track mode switch is conditioned by the applied line ten enable signal to revert to the search mode whenever a line ten interval terminates without the occurrence of a coincidence pulse during the interval. The Track signal is then removed, and switches 250, 252 and 254 are switched to their initial position.

Multiple reflections of a transmitted television signal can result in the reception of multiple ghosts, each exhibiting its own delay wth respect to the desired television signal. Accordingly, an arrangement is shown in FIG. 5 which, in cooperation with a number of ghost detector circuits such as the one shown in FIG. 1, will enable the acquisition of multiple ghost signals, including residual ghosts resulting from ghost cancellation.

Figure 5:
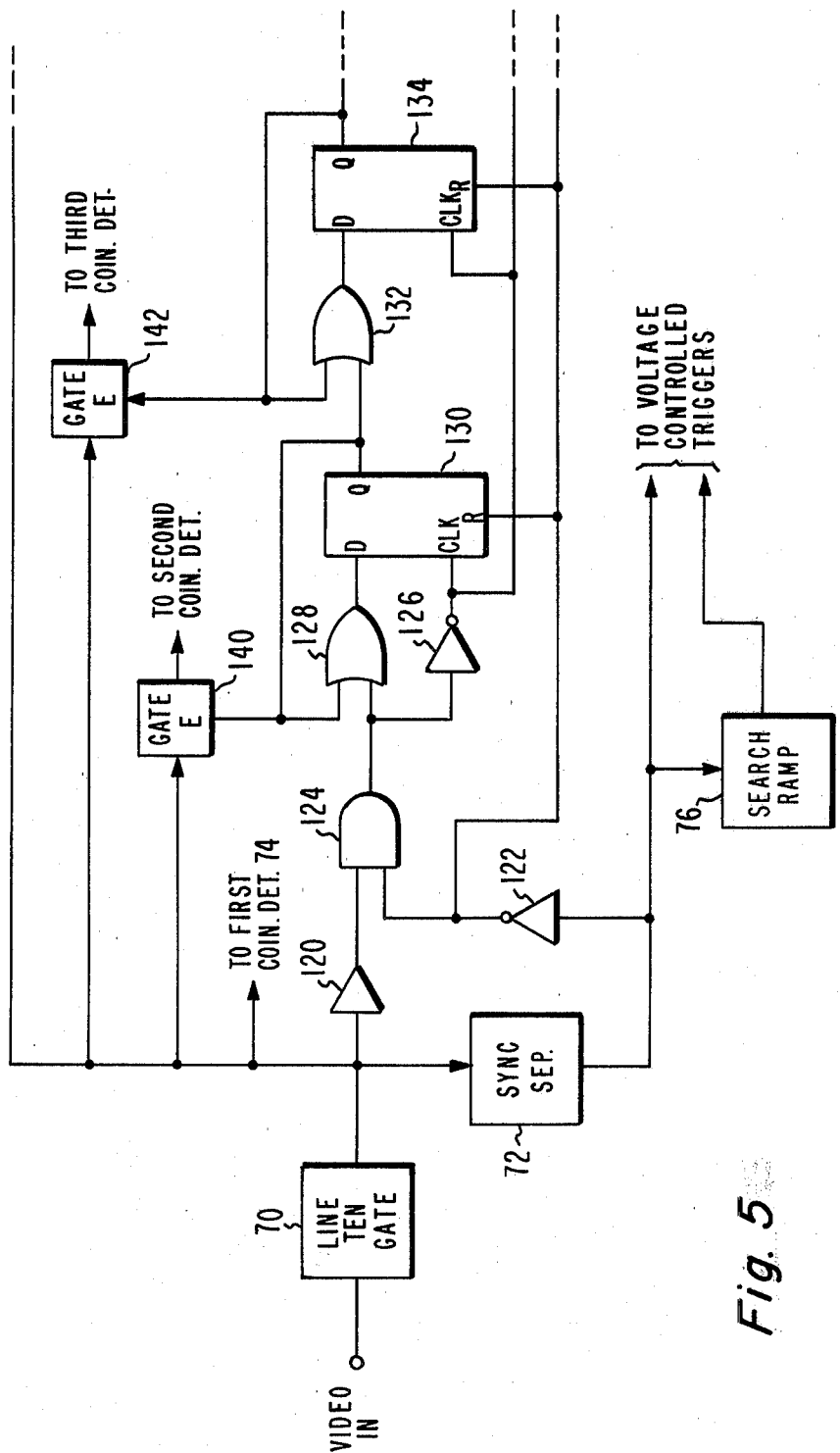
FIG. 5 illustrates a control system for a plurality of ghost detectors for detecting and tracking a plurality of ghost signals.

The control system of FIG. 5 is adapted to be utilized with a number of the search and track circuits of FIG. 1, including element 74 and 78–88 of that Figure. However, the plurality of circuits only requires the use of one line ten gate, one sync separator and one search ramp circuit to service all of the search and track circuits. The embodiment of FIG. 5 is suitable for controlling three search and track circuits, but it may be expanded for the acquisition of as many ghost signals as may be desired.

In FIG. 5, the output of the line ten gate 70 is coupled to the sync separator 72 and the coincidence detector 74 of FIG. 1. The line ten gate 70 output is also coupled to the input of an amplifier 120, which amplifies ghost signals in line ten to an amplitude above the threshold of the succeeding logic circuitry. The sync separator output is coupled to the search ramp circuit 76, as well as the voltage-controlled trigger of each search and track circuit used in the combination. The output of the search ramp circuit 76 is also coupled to each search and track circuit voltage-controlled trigger. The search ramp 76 of FIG. 5 is not inhibited by the search/track mode switch because its voltage ramp is provided to a number of search and track circuits. Storage of the search ramp input will thus be provided in each individual voltage-controlled trigger.

The output of amplifier 120 is applied to an AND gate 124, which also receives an inverted line ten sync pulse by way of inverter 122. The output of AND gate 124 is coupled to an inverter 126 and one input of an OR gate 128. The output of OR gate 128 is coupled to the data input of a D-type flip-flop 130. The output of the inverter 126 is applied to the clock inputs of D-type flip-flops 130 and 134. The Q output of flip-flop 130 is applied to respective inputs of OR gate 128, and OR gate 132, and the enabling input of a gate 140.

The output of OR gate 132 is coupled to the data input of flip-flop 134. The Q output of flip-flop 134 is coupled to a second input of OR gate 132 and the enabling input of a gate 142. Gates 140 and 142 have inputs coupled to the output of the line ten gate 70, and respective outputs coupled to the coincidence detector (corresponding to coincidence detector 74 of FIG. 1) of second and third search and track circuits (not shown).

Figure 6:
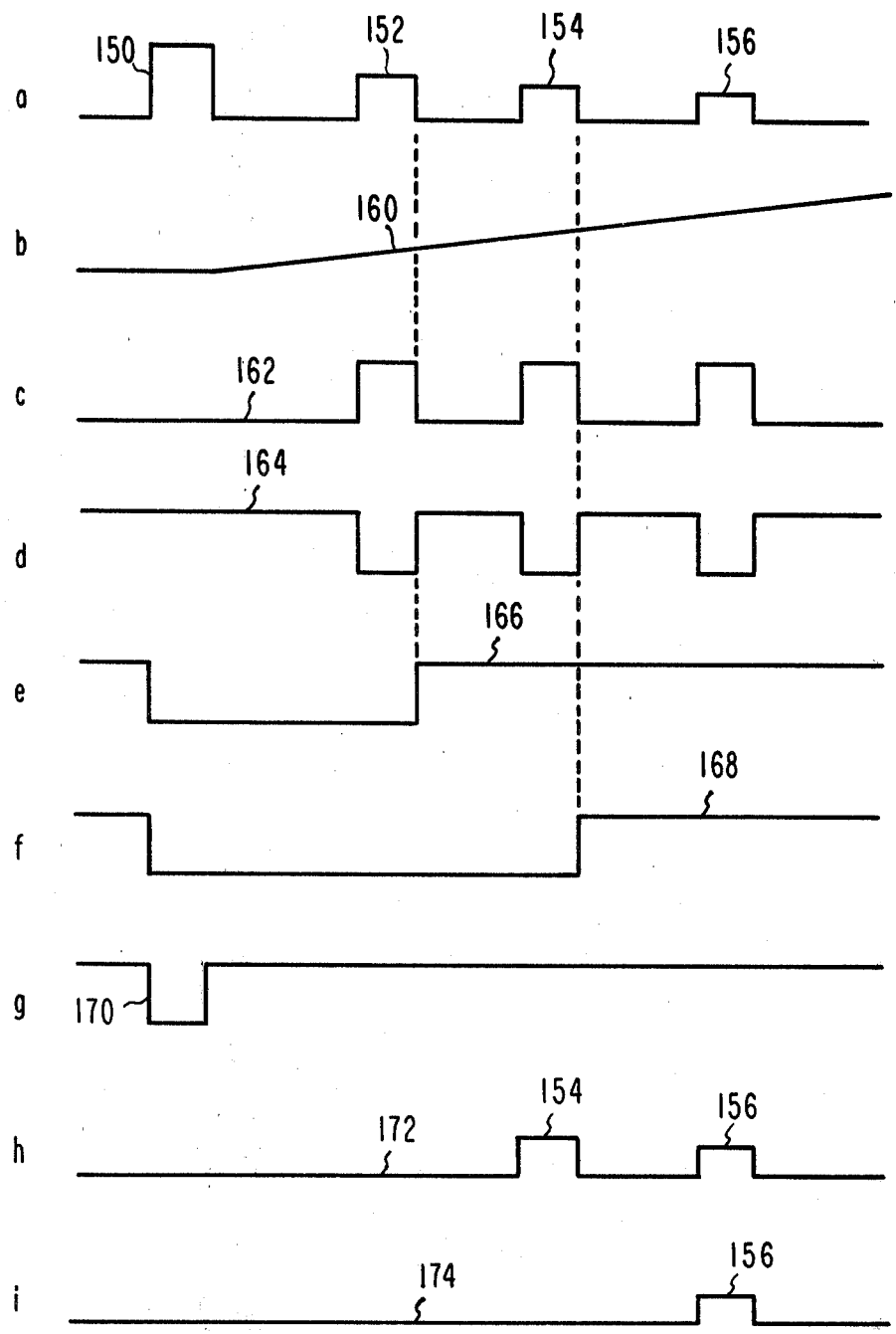
FIG. 6 shows waveforms illustrating the operation of the arrangement of FIG. 5.

The operation of the arrangement of FIG. 5 may be understood by referring to the waveforms of FIG. 6. The line ten gate 70 passes the waveform of FIG. 6a, including the line ten sync pulse 150 and ghost pulses 152, 154 and 156. The search ramp circuit 76 responds to the separated line ten sync pulse by producing a voltage ramp 160, shown in FIG. 6b. The AND gate 124 receives the amplified waveform of FIG. 6a at one input and an inverted sync pulse at the other input. Its output waveform 162 is shown in FIG. 6c, in which the sync pulse has been deleted.

The waveform 162 is coupled to the data input of flip-flop 130 by OR gate 128, and an inverted waveform 162, shown in FIG. 6d as waveform 164, is applied to the clock inputs of the flip-flops. Flip-flop 130 will therefore be "set" on the positive-going edge of the clock signal, which corresponds to the end of the first ghost pulse 152. The Q output will produce a waveform 166, shown in FIG. 6e.

The setting of flip-flop 130 will provide a positive signal at the data input of flip-flop 134 by way of OR gate 132. At the next rising edge of the clock signal 164, flip-flop 134 will be "set", at a time corresponding to the end of the second ghost pulse 154. Flip-flop 130 will remain set, since its Q output is connected back to its data input through OR gate 128. Similarly, the Q output of flip-flop 134 is connected back to its data input by way of OR gate 132. The output waveform 168 of flip-flop 134 is shown in FIG. 6f. Flip-flops 130 and 134 remain set until they are reset by the inverted line 10 sync pulse 170 of FIG. 6g, which is applied simultaneously to their reset inputs.

The first search and track circuit will receive the waveform of FIG. 6a at its coincidence detector 74. The circuit will locate the first ghost pulse 152 and track it through successive television fields. This first search and track circuit will ignore the succeeding ghost pulses 154 and 156, since its voltage controlled trigger will be inhibited from further searching once the search/track mode switch 88 has switched to the track mode after ghost pulse 152 has been acquired.

At the end of the first ghost pulse 152, waveform 166 goes high, which enables gate 140. The gate 140 will then pass the remaining ghost pulses 154 and 156 to the coincidence detector 74 of the second search and track circuit, as illustrated by waveform 172 of FIG. 6h. The second search and track circuit will lock onto pulse 154 and track this ghost, ignoring the succeeding ghost pulse 156.

At the end of the second ghost pulse 154, waveform 168 goes high, thereby enabling gate 142. The gate 142 will pass the remaining ghost pulse 156 to coincidence detector 74 of the third search and track circuit, as illustrated by waveform 174 of FIG. 6i. The third search and track circuit will therefore acquire and track the third ghost signal. Thus, the three search and track circuits will simultaneously track the three independent ghost signals, respectively.

As mentioned above, the search ramp level at the time of ghost acquisition is stored in the voltage-controlled triggers of the individual search and track circuits. The search ramp itself cannot be inhibited when a ghost is acquired, because the search ramp circuit is serving all of the search and track circuits. However, if each search and track circuit is provided with its own search ramp circuit, an alternative multiple ghost acquisition technique is possible. This alternative technique uses the search inhibit pulse of a search and track circuit to initiate the search ramp in a succeeding search and track circuit as explained below.

Figure 7:
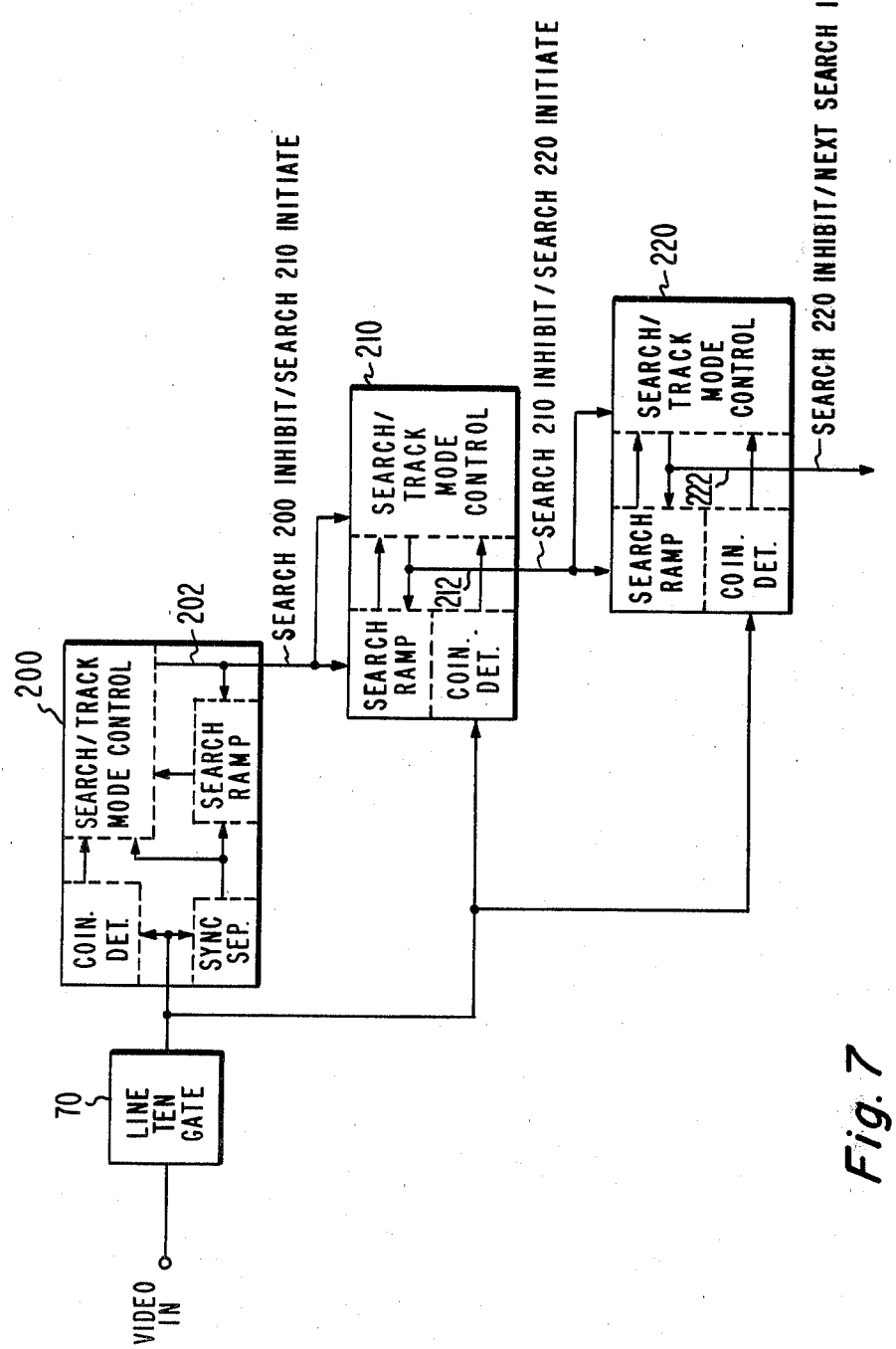
FIG. 7 illustrates an arrangement of a plurality of ghost detectors for detecting and tracking a plurality of ghost signals.

FIG. 7 shows an arrangment of three ghost detector systems of FIG. 1 which can search for and track three ghost signals. The arrangement may be expanded if desired to track additional ghost signals by cascading additional ghost detector circuits. The line ten gate 70 and the ghost detector 200 together comprise all of the elements of FIG. 1. The sync separator of ghost detector 200 provides the initiation signal for the search ramp and the voltage-controller trigger contained within the search/track mode control section of ghost detector 200. The output of the coincidence detector is also coupled to the search/track mode control section, which includes elements 78–88 of the arrangement of FIG. 1.

The search/track mode control section of ghost detector 200 provides an inhibit signal for the search ramp section of circuit 200 on a conductor 202. The inhibit signal on conductor 202 also serves as an initiation signal for the search ramp and voltage-controlled trigger sections of a second ghost detector 210.

The second and third ghost detectors 210 and 220 contain all of the elements of the arrangement of FIG. 1, with the exception of the line ten gate and the sync separator. The search ramp section of each detector is coupled to a voltage-controlled trigger in the search/track mode control section of each detector. The coincidence detector section of each detector has an iput coupled to the output of the line ten gate 70, and an output coupled to the respective search/track mode control section. The search/track mode control section of each detector applies a search inhibit signal to the search ramp section of the respective circuit. The search inhibit signal of detector 210 on conductor 212 is also the search initiate signal for detector 220. The search inhibit signal of detector 220 on conductor 222 is available as a search initiate signal for a succeeding ghost detector (not shown).

Figure 8:
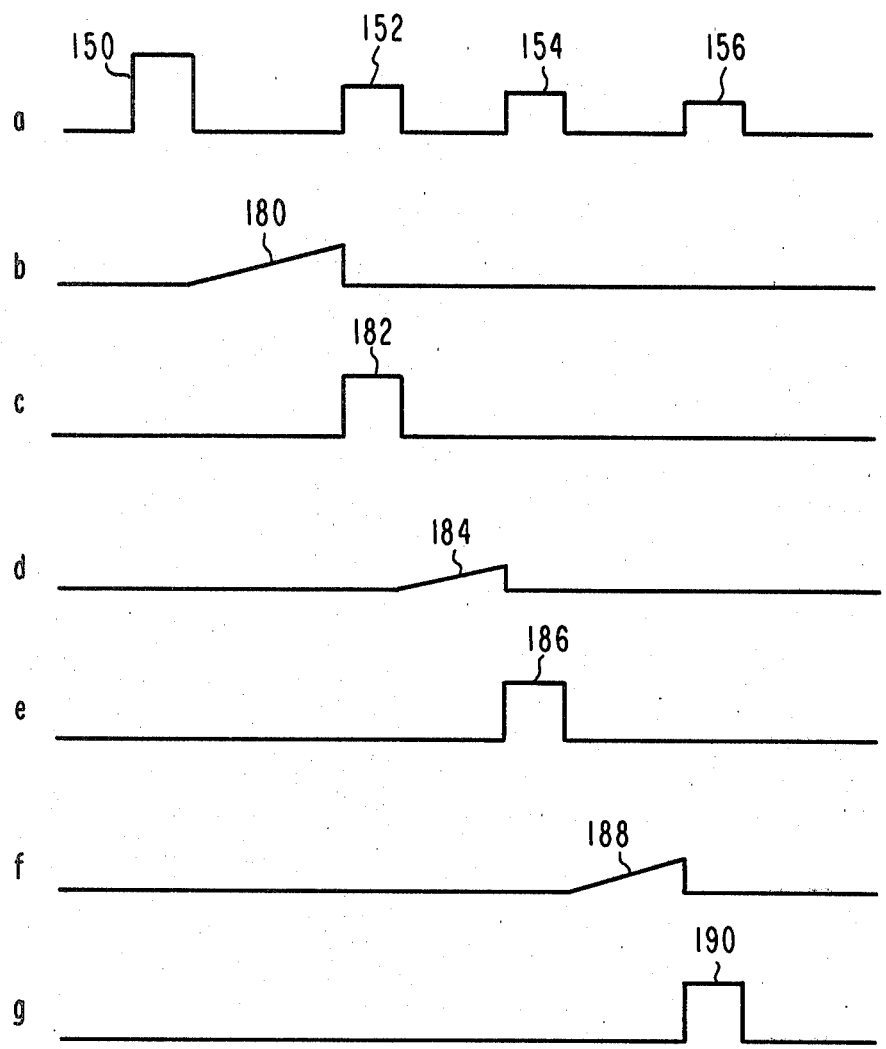
FIG. 8 shows waveforms illustrating the operation of the arrangement of FIG. 7.

The operation of the arrangement of FIG. 7 may be understood by referring to the waveforms of FIG. 8. The line ten gate produces a sync pulse 150 and ghost pulses 152, 154, 156, as shown in FIG. 8a. At the end of the sync pulse 150, the search ramp section of detector 200 produces a voltage ramp 180 for the search/track mode control section of that circuit, as shown in FIG. 8b. The ramp is halted when the search/track mode control section produces a search inhibit pulse 182 on conductor 202, as illustrated in FIG. 8c. This search inhibit pulse 182 is substantially in time coincidence with the ghost pulse 152 which is acquired and tracked by the ghost detector 200.

At the end of the inhibit pulse 182, the search ramp section of circuit 210 is activated so that ghost detector 210 may search for the second ghost pulse 154, as indicated by ramp 184 of FIG. 8d. Upon acquisition of this ghost pulse, voltage ramp 184 is terminated by the search inhibit pulse 186 on conductor 212, which is illustrated in FIG. 8e. At the end of search inhibit pulse 186, the search ramp section of ghost detector 220 is activated, thereby initiating a third ramp 188 as shown in FIG. 8f. When the third detector 220 acquires the third ghost pulse 156, the search/track mode control section of circuit 220 produces a search inhibit pulse 190 on conductor 22 as shown in FIG. 8g, thereby terminating search ramp 188 and providing a search initiation signal for a further ghost detector circuit.

It may be seen that ghost detectors 210 and 220 cannot lock onto the first ghost pulse 152, since their search ramps are not initiated until after the first detector 200 has acquired this ghost pulse. Likewise, the second and third ghost detectors can only acquire the second and third ghost pulses, respectively, due to the sequence of initiation and termination of their voltage ramps. Once the voltage ramp of a particular search and track circuit has been inhibited, it cannot search for a subsequent ghost signal.

What is claimed is:

1. In a television receiver, including a source of video signals which may be contaminated with a ghost signal, said video signals including a component subject to use as a training signal, a television ghost detection system comprising:

means responsive to said video signals and having an output for passing a portion of said video signals which includes said training signal and a ghost of said training signal when a ghost signal is present;

a reference signal circuit having an input responsive to said training signal for producing a varying reference signal at an output;

signal generating means having an input coupled to the output of said reference signal circuit and an output, and responsive to said reference signal for producing, in a first mode of operation, a sequence of search signals;

a coincidence detector having a first input coupled to said output of said video signal portion passing means, a second input coupled to the output of said signal generating means, and an output at which a coincidence signal is produced, when said signal generating means is operating in said first mode, in response to the application of a ghost of said training signal to said first input in time coincidence with the application of a search signal to said second input; and means, coupled between the output of said coincidence detector and said reference signal circuit, and responsive to said coincidence signal for storing the level attained by said varying reference signal when said coincidence signal is produced, wherein said stored reference signal level is representative of the delay of said ghost signal of said video signals with respect to said video signals.

2. The television signal ghost detection system of claim 1, wherein said signal generating means is operational in a second mode of operation, and wherein said system further comprises:

means having an input coupled to the output of said coincidence detector and an output coupled to said signal generating means, and responsive to said coincidence signal for changing the mode of operation of said signal generating means from said first mode to said second mode, wherein said signal generating means, when operating in said second mode, produces a track signal, in lieu of said sequence of search signals, when said varying reference signal is substantially equal to said stored reference signal level, wherein said coincidence detector is operable, when said signal generating means is operating in said second mode, to indicate the coincidence of said ghost of said training signal with said track signal;

a phase detector having a first input coupled to the output of said coincidence detector, a second input coupled to said signal generating means, and an output at which a phase comparison signal is produced which is representative of the phase relationship between the output signal of said coincidence detector and said track signal; and means for utilizing said phase comparison signal to modify said stored reference signal level.

3. The arrangement of claim 1 wherein said video signal are subject to contamination with a plurality of ghost signals, and further comprising:

a controllable gate having an input coupled to the output of said video signal portion passing means, an output, and a control input;

a second coincidence detector having a first input coupled to the output of said controllable gate, a second input coupled to receive search signals, and an output for producing a second coincidence signal in response to the application of a ghost of said training signal to its first input in time coincidence with the application of a search signal to its second input;

means coupled between the output of said second coincidence detector and said reference signal circuit, and responsive to said second coincidence signal, for storing the level attained by said varying reference signal when said second coincidence signal is produced; and a control circuit for controlling the operation of said second coincidence detector comprising means, having an input coupled to the output of said video signal portion passing means, and an output coupled to said control input of said controllable gate, and responsive to the appearance of a ghost of said training signal in said video signal portion for enabling said controllable gate to conduct a succeeding interval of said video signal portion to said first input of said second coincidence detector.

4. The arrangement of claim 3, wherein said controllable gate enabling means comprises:

a training signal separator circuit having an input coupled to the output of said video signal portion passing means and an output at which said training signal exclusive of its ghosts is reproduced;

a gate circuit having a first input coupled to the output of said video signal portion passing means and a second input coupled to the output of said training signal separator circuit and an output for transmitting that interval of said video signal portion succeeding said training signal; and a flip-flop having a data input coupled to receive said interval of said video signal portion succeeding said training signal and an output coupled to said control input of said controllable gate, and clocked upon the termination of a ghost of said training signal which appears in said interval of said video signal portion.

5. The arrangement of claim 4, wherein said flip-flop further includes a reset input coupled to the output of said training signal separator circuit to receive said reproduced training signal as a reset signal.

6. The arrangement of claim 1, wherein said video signals are subject to contamination with a plurality of ghost signals, and further comprising:

a second reference signal circuit having an input responsive to said coincidence signal for producing a second varying reference signal at an output;

second signal generating means having an input coupled to the output of said second reference signal circuit and an output, and responsive to said second reference signal for producing a sequence of search signals;

a second coincidence detector having a first input coupled to said output of said video signal portion passing means, a second input coupled to the output of said second signal generating means, and an output at which a coincidence signal is produced in response to the application of a ghost of said training signal to its first input in time coincidence with the application of a search signal to its second input; and means, coupled between the output of said second coincidence detector and said second reference signal circuit, and responsive to said second coincidence signal for storing the level attained by said second reference signal when said second coincidence signal is produced.

* * * * *